United States Patent

[19]

[11] 3,844,807
[45] Oct. 29, 1974

[54] COMPOSITIONS AND METHOD FOR MAKING WATER RESISTANT, SHORT TACK ADHESIVES

[75] Inventor: Gerald F. Bramel, Niantic, Ill.

[73] Assignee: A. E. Staley Manufacturing Company, Decatur, Ill.

[22] Filed: May 29, 1973

[21] Appl. No.: 364,571

[52] U.S. Cl.............. 106/213, 106/210, 117/156, 260/17.3
[51] Int. Cl............................................. C08b 27/22
[58] Field of Search................ 106/208, 213, 211; 117/122.5

[56] References Cited
UNITED STATES PATENTS

| | | | |
|---|---|---|---|
| 2,475,368 | 7/1949 | Bauer et al. | 166/210 |
| 3,485,651 | 12/1969 | Ganz | 106/213 |
| 3,640,756 | 2/1972 | Beersman | 117/122 S |
| 3,690,938 | 9/1972 | Swift | 117/122 S |

*Primary Examiner*—Theodore Morris
*Attorney, Agent, or Firm*—Howard J. Barnett; Charles J. Meyerson

[57] ABSTRACT

A pre-blend adhesive system for tailoring adhesive systems to particular paper products bonding applications requirements. The pre-blend system comprises two premix blends of acid hydrolyzed starch, hydroxyethylated starch, buffering salts and a specific type starch modifier, more particularly polyoxyethylene laurate. The salts provide a desirable pH for good storage stability of the resulting adhesive paste after the above preblends and mixtures thereof are slurried with water and resin added for water resistance and the mixture is cooked to form a short, water resistant liquid adhesive paste, particularly useful in the manufacture of multi-wall envelope bags having adhesive bonded bottom and side seams.

In the adhesive systems of this invention, only about one half the amount of resin previously used is required to obtain a water resistant bond, and the water resistance develops in a considerably shorter time period after fabricating the adhesive bonded product, thereby shortening the time period required fro aging newly bonded products prior to using them in an environment requiring full water resistant properties.

15 Claims, No Drawings

COMPOSITIONS AND METHOD FOR MAKING WATER RESISTANT, SHORT TACK ADHESIVES

BACKGROUND OF THE INVENTION

There are a great number of varieties of automatic machines and applicators for making paper articles such as multi-wall paper bags, containers and other adhesive bonded articles. The adhesive flow characteristics, wet tack, and machinability of the adhesive are all subject to some variation in parameters as determined by the particular apparatus employed in the adhesive application system. In most adhesive applicator equipment, it is desirable to use an adhesive having a "short" paste so the adhesive will break clean from the applicator. A number of techniques have been used in the paste to get the desired paste characteristics, but to applicant's knowledge no universal pre-blend system has been proposed which greatly simplifies the procedure for varying the adhesive properties by a simple proportioning of two compatible pre-blends. Such a simplified pre-blending system is desirable, and will greatly facilitate tailoring the adhesive to the particular equipment being used.

PRIOR ART

The earlier disclosures in the adhesive formulation field generally contemplate higher pH levels, most generally alkaline in nature. No effort was apparently made to hold these adhesives in storage for any length of time after liquid formulation, and it has been generally observed by applicant that these more alkaline products are stable in liquid paste form for only short periods of time.

U.S. Pat. No. 3,155,527 issued Nov. 3, 1964, describes an adhesive which is alleged to impart water resistant properties to paper products. That product comprised a starch polymer, an alkaline material, urea, formaldehyde, and water. The pH of the mixed liquid adhesive was stated to be between about 10 and about 12.5. The "pot life" for this product after mixing is "several hours." This greatly limits the length of time between storage and use.

Another adhesive formulation is described in U.S. Pat. No. 3,331,697, issued July 18, 1967. The level of solids disclosed in that patent ranges from 45-75 percent, and the ingredients include 5-10 percent of a hydroxyethylated starch; 4-10 percent asbestos filler; 45-55 percent finely divided limestone; and water. The object of this patent is to provide an adhesive for bonding gypsum and cellulosic materials. Although the patent states the adhesive has a good shelf life in liquid form, the longest liquid storage period disclosed was only 24 hours. No mention of water resistance is made, nor of any resin material which might contribute to it. Wetting agents including 150 octylphenoxypoly (ethyleneoxyl) ethanol and nonyl phenyl polyethylene glycol ether are disclosed.

DETAILED DESCRIPTION OF THE INVENTION

As presently contemplated, the pre-blend adhesive mix of the invention is preferably marketed as a dry product in two distinct blends which have different proportions of the same ingredients. The urea formaldehyde resin and water are added at the paper bag fabricating facility in the proportions to be described below to provide a liquid adhesive which can be stored without any loss of function for periods up to three weeks. Prior to applicant's invention, liquid storage of such water resistant adhesives for periods longer than about 5-7 days was relatively unknown. The convenience of including the salts, starches, surfactant, clays and pH buffers in the preblend eliminates the need to formulate, measure and blend a variety of starches, clays, soaps, salts, preservatives and buffers before cooking the adhesive, and formulation by the user becomes a simple, single step operation. It should be noted that emulsifier-surfactants such as conventional soaps, including calcium and sodium stearate; sodium lauryl sulfate; stearyl trimethyl ammonium chloride; sulfonated tallows and oils; and sodium dodecyl benzene sulfonates have been tried with no great promise, and are not considered as effective as polyoxyethylene laurate. Other emulsifier surfactants which are believed effective include polyoxyethylene mono and di laurates, polyoxyethylene stearates, polyoxyethylene oleates and polyoxyethylene tallates.

The dry preblends are presently formulated as follows:

| Ingredient | Preblend No. 1 % by Wt. (as is) | Preblend No. 2 % by Wt. (as is) |
|---|---|---|
| Hydroxyethylated corn starch (2% reacted with ethylene oxide) | 4.7 | 17 |
| Acid hydrolyzed corn starch | 89.3 (thin - 100-200 cps. Brookfield viscosity 100°F. 100 rpm No. 1 spindle using 80 gm. starch, 320 gms. water & cooked) | 77 (thick - 11,500- 12,500 cps. Brookfield viscosity (15% solids, 20 rpm No. 5 spindle) |
| Granular zinc chloride | .6 | .4 |
| Predispersed HT Clay No. 2 | 3 | 3 |
| Potassium chloride | 2 | 1.4 |
| Polyoxyethylene laurate | .4 | 1 |
| Powdered aluminum sulfate or $Na_2CO_3$ | Sufficient for pH adjustment | Sufficient for pH adjustment |

The above described Preblend No. 1 has been found most useful for bonding the side seams of envelope type multi-wall paper bags. It has the following advantages:

Good tack, quickly forms a tight, water resistant bond.

Reduces penetration of bag plys, thus eliminating "inner-bonding."

Produces excellent bonds on "glueable" polyethylene coated papers and other specialty papers.

Add only resin and water to make pastes, no other ingredients, no pH adjustment required.
No pH buffering.
Reduces resin usage by 50 percent (using UF).
Excellent viscosity stability during storage . . . can be held 2 to 3 weeks before using.
Performs well in machine operations, remaining fluid in pans during prolonged runs.
Is acceptable as a food packaging adhesive under FDA regulations. When preblend No. 1 is used, the amount of urea formaldehyde resin typically used in a seam paste can be reduced by approximately 50 percent without sacrificing desired water resistant properties. This reduced ingredient requirement is a significant cost savings factor.

Preblend No. 1's pH buffering system which eliminates the need to manually adjust the pH of the paste after make-up, even though the liquid paste may be stored 2 weeks or more before using.

A typical adhesive formulation using Preblend No. 1 is:

| | |
|---|---|
| Preblend No. 1 | 100 lbs. |
| Water | 27 gallons |
| Urea Formaldehyde Resin (65% solids) | 7 lbs. |

The above is mixed at room temperature, then heated to 190°F. for 20 minutes. It is then cooled to application temperature. The prepared paste has the following properties:

| | |
|---|---|
| Color | Off White |
| Solids, % | 25–27 |
| pH | 5.5 |
| Viscosity:Brookfield, cps. (at 80°F., No. 3 spindle: 20 rpm) | 400–800 |

Preblend No. 2 has a much thicker acid hydrolyzed starch ingredient (subjected to less acid hydrolysis), and is specifically useful for bottom seams of multi-wall paper bags. The amount of emulsifier-surfactant present (polyoxyethylene laurate) is more than double that present in Preblend No. 1, and the balance between the hydroxyethylated starch/acid hydrolyzed starch has shifted to about three times the amount of hydroxyethylated starch. The zinc chloride is less, as is the potassium chloride. Both Preblends are designed to produce stable liquid resin-containing paste adhesives at acid pH levels (3–5), which are still useful after two to three weeks' storage in liquid form.

As with Preblend No. 1, Preblend No. 2 is blended with water and a resin such as urea formaldehyde (to give water resistant bonds). The higher viscosity of the resulting adhesive paste is more suitable to the applicator technique used for bag bottoms. The amounts of water and urea formaldehyde resin used to make the bottom seam adhesive paste are substantially as set forth above for Preblend No. 1.

The urea formaldehyde cannot normally be stored with the Preblends because it tends to crosslink the starch too soon. Other earlier adhesives using this type of resin normally used about twice the amount, and this may have been the reason they could only be stored for very short periods in the liquid form. Applicant's preblends are believed to be stable because of the combined action of the emulsifier-surfactant (polyoxyethylene laurate), zinc chloride and potassium chloride. The presence of the minor amount of ethylated starch improves the rheology tack and storage properties. The clay reduces penetration of the adhesive.

The above Preblends 1 and 2 can be blended in any desired proportions to give an adhesive blend anywhere in between the two preblends in any desired intermediate viscosity and at any desired intermediate solids level from about 15 to 30 percent solids. The two preblends are compatible at any combination, and give completely predictable properties with a long liquid storage shelf life potential. Only about one half the amount of the normally required urea formaldehyde resins is needed to impart good water resistance to Preblends 1 and 2. The non-soap emulsifier surfactant seems particularly important in the realization of the lower resin requirement and the long liquid storage stability. Apparently resin/starch reactivity is increased by the polyoxyethylene laurate, but not while in liquid form. Another possible emulsifier-surfactant which might replace the presently used one is the reaction product of tridecyl alcohol with four moles of ethylene oxide. This product is believed to have generally the same properties which make the polyoxyethylene laurate effective for this purpose.

I claim:

1. An adhesive composition dry premix consisting essentially of:
   75–92 percent by weight of an acid hydrolyzed starch, having a Brookfield viscosity ranging from: 100–200 cps. at 100°F., 100 rpm, using a No. 1 spindle and 80 g starch, 320 g water and cooked, to 11,500–12,500 cps, when tested at 15 percent solids after cooking, using a No. 5 spindle at 20 rpm at 100°F., up to 20 percent by weight of an hydroxyalkylated starch, about 0.3 to 0.7 percent by weight of a first inorganic salt of a weak base and a strong acid, about 3 percent by weight of a pre-dispersed clay, about 1.5 to 2.5 percent of a second inorganic salt of a strong base and a strong acid, and about 0.3 to 1.5 percent by weight of an emulsifier-surfactant selected from the group consisting of polyoxyethylene laurate, poolyoxyethylene stearates, polyoxyethylene oleates, polyoxyethylene tallates, and the reaction product of tridecyl alcohol and ethylene oxide, and mixture thereof said dry premix being stable in liquid form for more than ten days when mixed with about 77.2 percent by weight added water and about 1.3 percent by weight added 65 percent solids urea formaldehyde resin at a pH ranging from 3–5.

2. The adhesive composition of claim 1, in which the first and second inorganic salts comprise zinc chloride and potassium chloride.

3. The adhesive composition of claim 1, in which the hydroxyalkylated starch comprises an hydroxyethyl starch obtained by reacting starch with about 2 percent by weight ethylene oxide.

4. The adhesive composition of claim 1, in which the acid hydrolyzed starch comprises about 90 percent by weight of the premix and has a Brookfield viscosity of about 100–200 centipoises when 80 grams of the starch is cooked with 320 grams of water and cooled to 100°F., measured at 100 rpm using a No. 1 spindle.

5. The adhesive composition of claim 4, in which there is about 4.7 percent by weight of hydroxyethyl starch present as the hydroxyalkylated starch, the first and second inorganic salts comprise about 0.6 percent by weight zinc chloride and about 2 percent by weight potassium chloride, respectively, and the emulsifier-surfactant comprises about 0.4 percent by weight of polyoxyethylene laurate.

6. The adhesive composition of claim 1 in which the acid hydrolyzed starch comprises about 77 percent by weight of the premix, and has a Brookfield viscosity of about 1,950 centipoises when tested at 15 percent solids after cooking using a No. 5 spindle at 20 rpm at 100°F.

7. The adhesive composition of claim 6, in which there is about 17% by weight of the hydroxyalkylated starch present, the first inorganic salt comprises about 0.4 percent by weight zinc chloride, said second inorganic salt comprises about 1.4 percent by weight potassium chloride, and the emulsifier-surfactant comprises about 1 percent by weight of polyoxyethylene laurate.

8. The adhesive composition of claim 1, in the combination of about 20–30 percent by weight of said premix with about 1–2 percent by weight of 65 percent solids urea formaldehyde resin, and about 65–80 percent by weight water to provide a liquid adhesive composition having a refractometer solids ranging from about 15–30 percent solids at a pH of about 3–5, and which retains its adhesive strength for at least ten days in the liquid paste when stored at room temperatures not above 100°F.

9. The method of preparing a water resistant adhesive composition for bonding seams of paper products including multi-wall envelope bags, polyethylene coated papers, and specialty papers and paper board products requiring water resistant bonds, the steps comprising: first preblending a dry premix composition consisting essentially of 75–92 percent by weight of an acid hydrolyzed starch having a Brookfield viscosity ranging from 100–200 cps. at 100°F., 100 rpm using a No. 1 spindle and a 80 g starch/320 g water (cooked) to 11,500–12,500 cps tested cooked sample at 15 percent solids, No. 5 spindle, 20 rpm, 100°F.; up to 20 percent by weight of an hydroxyalkylated starch; about 0.3 to 0.7 percent by weight of a first inorganic salt of a weak base and a strong acid; about 1.5 to 2.5 percent by weight of a second inorganic salt of a strong base and a strong acid, and about 0.3 to 1.5 percent by weight of an emulsifier-surfactant selected from the group consisting of polyoxyethylene laurate, the reaction product of tridecyl alcohol and ethylene oxide, polyoxyethylene stearates, polyoxyethylene oleates, and polyoxyethylene tallates, and mixtures thereof; and then mixing said dry premix composition with water and about 1–4.5 percent by weight based on the weight of the starch of a water resistant resin compound to make a liquid adhesive composition having a solids level ranging from 15–30 percent, said liquid adhesive remaining stable for more than ten days.

10. The method of claim 9, in which the first and second inorganic salts comprise zinc chloride and potassium chloride, respectively, and the emulsifier-surfactant is polyoxyethylene laurate.

11. The method of claim 9, in which the water resistant resin is urea formaldehyde.

12. The method of claim 9, in which there is about 17 percent by weight of the hydroxyalkylated starch present, the first inorganic salt comprises about 0.4 percent by weight zinc chloride, said second inorganic salt comprises about 1.4 percent by weight potassium chloride, and the emulsifier-surfactant comprises about 1 percent by weight of polyoxyethylene laurate.

13. The method of claim 9, in which there is about 4.7 percent by weight of hydroxyethyl starch present as the hydroxyalkylated starch, the first and second inorganic salts comprise about 0.6 percent by weight zinc chloride and about 2 percent by weight potassium chloride, respectively, and the emulsifier-surfactant comprises about 0.4 percent by weight of polyoxyethylene laurate.

14. The method of claim 9, in which about 20–30 percent by weight of said premix is blended with about 1–2 percent by weight of a water resistant resin comprising 65 percent solids urea formaldehyde resin, and including about 65–80 percent by weight water to provide a liquid adhesive composition having a refractometer solids ranging from about 15–30 percent at a pH of about 3–5, and which retains its adhesive strength for at least ten days in the liquid paste when stored at temperatures below about 100°F.

15. The method of claim 9, in which said first and second inorganic salts are selected from the group consisting of aluminum sulfate, zinc chloride, and potassium chloride.

* * * * *